Figure 1:

May 8, 1928.

J. A. SEBENIUS

FISH LURE

Filed Feb. 3, 1927

1,669,350

WITNESSES
J Markey

INVENTOR
J. A. SEBENIUS.
BY Munn &Co.
ATTORNEY

Patented May 8, 1928.

1,669,350

UNITED STATES PATENT OFFICE.

JOHN A. SEBENIUS, OF BREMERTON, WASHINGTON.

FISH LURE.

Application filed February 3, 1927. Serial No. 165,629.

This invention relates to fishing tackle and more particularly for lures for trolling spoons.

It is well known that when trolling or casting for game fish, a spoon is used equipped with a hook or hooks, and to entice the fish to strike, an attractive lure must be used.

A primary object of the invention is to provide a spoon of this character so constructed that when drawn through the water it will have a snapping, diving, zig-zag motion simulating the movement of an injured minnow.

Another object is to provide a trolling spoon having a hook equipped with an attractive element or lure so mounted that the movement of the spoon through the water would impart to the lure and hook a quick side to side movement thus rendering it attractive to the fish causing it to strike and be caught by the hook.

Another object is to provide a fish hook with a bright, rust proof metal lure so mounted on the hook that it may be readily applied or removed to adapt it for use on different hooks in case of breakage or when it is desired to change the size of the hook.

In carrying out these objects, the invention is susceptible of a wide range of modification without departing from the spirit or sacrificing any of the advantages of the claimed invention; there being shown in the drawings for illustrative purposes certain preferred and practical forms, in which:—

Figure 2:
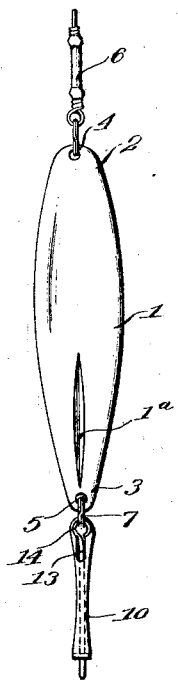
Figure 3:
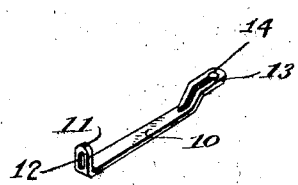

Figure 1 represents a side elevation of a trolling spoon constructed in accordance with this invention and equipped with a lure forming a part of the invention, Figure 2 is a rear elevation thereof, and Figure 3 is a detail perspective view of the lure detached.

In the embodiment illustrated a trolling spoon 1 is shown composed of any suitable rust proof metal, such as bronze, copper, nickel, silver or the like, and which is curved longitudinally and slightly transversely tapering from its head or front end 2 to its rear or tail end 3, as is shown clearly in Fig. 2. The head 2 is apertured as shown at 4 to receive a split ring 4ª for connection with a line connecting swivel 6. The tail end is also apertured as shown at 5 to receive a split ring 7 with which is movably connected the eye 8ª of the fish hook 8, this eye being mounted at the outer end of the shank 9 as is usual in fish hooks.

Carried by the hook 8 is a fish attracting element or lure 10 preferably made from a strip of rust proof plate metal such as copper, brass, bronze, nickel or the like and which extends substantially throughout the length of the shank 9 of the hook having its lower end bent laterally as shown at 11 and apertured as shown at 12 for the passage therethrough of the barbed end of the hook 8. The other end of the strip 10 which is offset in the same direction as the lateral extension 11, is slotted longitudinally as shown at 13, said slot merging at its outer end in an opening 14 of a size sufficient to permit the passage therethrough of the eye 8ª of the hook shank when said eye is turned edgewise.

This metal strip or lure 10 which is formed from rust proof sheet metal will retain its brightness when submerged in salt or fresh water and when swaying from side to side with the hook in a quick jerky manner such as is caused by the movement of the spoon will entice the fish to strike. It is understood that it is desirable to give added attraction and brightness to the tail end of the spoon which carries the hook so that the fish in striking will strike this part of the spoon rather than the body thereof.

In mounting the strip on the hook the point of the hook is first inserted through the aperture 12 in the lateral extension 11 and the eye 8ª of the hook is inserted through the slot 13, a one-half turn to the right or left being imparted to the strip or the hook which will permit the eye 8ª to pass through the slot and be located in the rear of the apertured end 14 of the strip, as is shown clearly in Fig. 1. The split ring 7 is then inserted through the registering eyes 8ª and 14 of the hook shank and strip and the device is ready for attachment to the tail end of the spoon which is accomplished by passing the split ring 7 through the aperture 5 in said end. To separate the lure from the hook the above described operation is reversed.

It is, of course, understood that the metal strip or lure 10 will be made to match the hook for which it is intended according to the size of the hook and the spoon with which the lure is to be employed.

Without further description it is thought that the features and advantages of the invention will be readily apparent to those skilled in the art, and it will of course be understood that changes in the form, proportion and minor details of construction may be resorted to, without departing from the spirit of the invention or its scope as claimed.

I claim:—

1. A lure for fish hooks comprising a bright metal rust proof strip having one end provided with hook shank engaging means and the other with eye engaging means.

2. A lure for fish hooks comprising a bright metal rust proof strip having a laterally apertured lug at one end to receive and encircle a fish hook shank, the other end being offset in the direction of said lug and slotted longitudinally and apertured to receive the eye end of the hook shank.

3. A lure for fish hooks comprising a bright metal rust proof strip having a laterally extending longitudinally slotted lug at one end to receive and encircle a fish hook shank, the other end being offset in the direction of said lug and slotted longitudinally to receive the eye end of the hook shank.

JOHN A. SEBENIUS.